United States Patent
Worsham et al.

(10) Patent No.: US 11,360,297 B2
(45) Date of Patent: Jun. 14, 2022

(54) MARKER ATTACHMENT DEVICE FOR A BORESCOPE

(71) Applicant: Delta Air Lines, Inc., Atlanta, GA (US)

(72) Inventors: Donald Keith Worsham, Stockbridge, GA (US); Matthew Law Banks, Brooks, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 181 days.

(21) Appl. No.: 16/795,908

(22) Filed: Feb. 20, 2020

(65) Prior Publication Data

US 2021/0263297 A1 Aug. 26, 2021

(51) Int. Cl.
*G02B 23/24* (2006.01)
*F01D 21/00* (2006.01)

(52) U.S. Cl.
CPC ....... *G02B 23/2476* (2013.01); *F01D 21/003* (2013.01); *F05D 2270/804* (2013.01)

(58) Field of Classification Search
CPC ................................................ G02B 23/2476
See application file for complete search history.

(56) References Cited

U.S. PATENT DOCUMENTS

| 5,066,122 A | 11/1991 | Krauter |
| 7,121,098 B2 | 10/2006 | Hatcher |
| 2006/0146127 A1 | 7/2006 | Bagley et al. |
| 2008/0248673 A1* | 10/2008 | Boehnlein .......... A61B 1/00052 439/320 |
| 2012/0204395 A1 | 8/2012 | Jones et al. |
| 2014/0023428 A1* | 1/2014 | Kappel .............. A61B 1/00128 403/53 |
| 2016/0000301 A1* | 1/2016 | Langell .............. A61B 1/00062 600/103 |
| 2017/0095140 A1 | 4/2017 | Makita |

FOREIGN PATENT DOCUMENTS

WO WO-2017164836 A1 * 9/2017 ............. A61B 1/247

OTHER PUBLICATIONS

International Search Report and Written Opinion in counterpart International Application No. PCT/US2021/014139, dated Apr. 30, 2021, 12 pages.

* cited by examiner

*Primary Examiner* — Michael A Lyons
(74) *Attorney, Agent, or Firm* — Edell, Shapiro & Finnan, LLC (57) ABSTRACT

An attachment device that includes an attachment body having a proximal end and a distal end configured to receive an applicator to mark a target. The attachment body further includes an engagement tab disposed between the proximal end and distal end. The engagement tab is configured to engage a tip of a borescope.

20 Claims, 9 Drawing Sheets

MARKER ATTACHMENT DEVICE FOR A BORESCOPE

TECHNICAL FIELD

The present invention relates to the field of borescopes and, in particular, a marker attachment for a borescope.

BACKGROUND

As devices become more complex, periodic inspection of the device's components disposed in a concealed space may be desired. Inspecting the internal components within the concealed space without disassembling the device may be the only option for some devices. Often, the components are difficult to reach by hand due to size constraints of the concealed space.

Generally, borescopes are instruments commonly used for inspecting an object or target in a concealed space. A borescope generally includes an elongated body having a proximal end and distal end. A tip of the borescope, located at the distal end, includes optics for capturing images. A display or eyepiece for receiving the captured images may be disposed at the proximal end. The elongated body may be flexible and/or have an articulating distal end. The articulating distal end enables a user to position an object in the field of view of the optics.

Based on the inspection, a target component of one more similar or identical components within the device may be determined to be damaged or worn. For example, the device may be a turbine engine, and the target component may be a worn or damaged blade. Based on the amount of the damage or wear, a user may further determine to replace the target component or note that the target component be monitored for replacement at a later date. The device may be disassembled to access the target component. During disassembly, determining which component is the target component may be difficult. Additionally, it may be difficult to determine which component is the target component to be monitored at a subsequent inspection.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures.

DESCRIPTION OF EXAMPLE EMBODIMENTS

The following description is not to be taken in a limiting sense but is given solely for the purpose of describing the broad principles of the invention. Embodiments of the invention will be described by way of example, with reference to the above-mentioned drawings showing elements and results according to the present invention.

Overview

Generally, a marker attachment device for a borescope is presented that enables easy and reliable marking of a target component of one or more components of a device. The marker attachment device is affixed to a tip of the borescope. The borescope and the affixed marker attachment device are inserted into a port of the device for inspection of one or more components concealed within the device. When a target component of the one or more concealed components is determined to be damaged or worn, a user can manipulate the borescope to place an applicator of the marker attachment device in contact with the target component to physically mark with an ink carried by the applicator the target component for replacement or monitoring. Accordingly, a user may disassemble the device and easily determine target components from the one or more components of the device. For example, a user may inspect an interior component of a turbine with a borescope fixed with a marker attachment. The component may be a fan blade, compressor blade, turbine blade, rotor, shroud, casing, strut, transmission gear, or other component of a turbine. While the present disclosure describes the use of the marker attachment device for marking turbine components, the marker attachment device may be used for marking any device or component.

Example Embodiments

Figure 1:
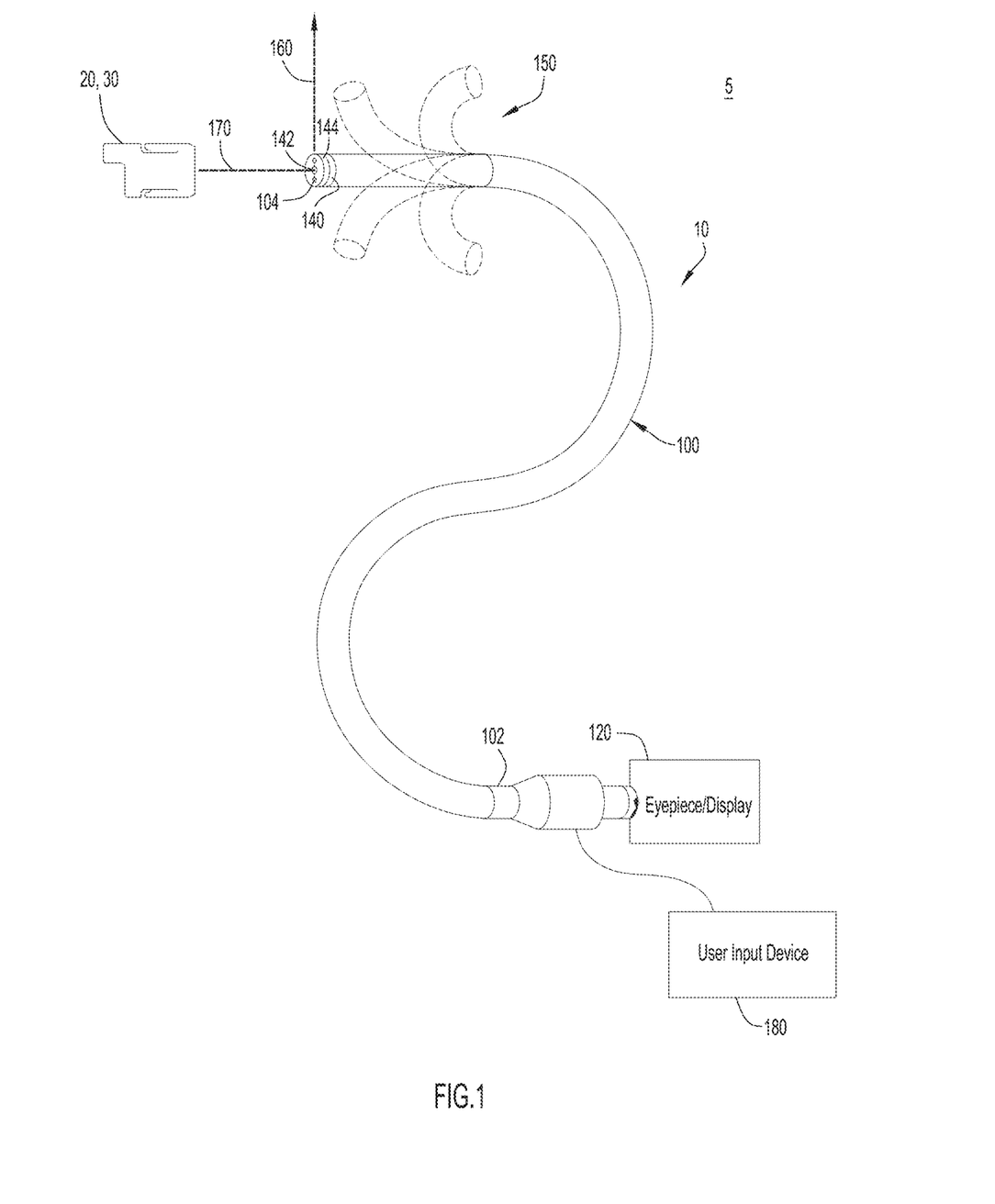
FIG. 1 is a diagram of a marker system having a borescope and a marker attachment device, according to an example embodiment.

Now referring to FIG. 1, an exemplary embodiment of a marker system 5 that includes a borescope 10 and a marker attachment device 20, 30 is shown. The figures illustrate two example forms of the marker attachment device 20, 30. The first example form of the marker attachment device 20, 30 is denoted by reference numeral 20 and described in more detail below in connection with FIGS. 2, 3A, 3B, 4A and 4B. The second example form of the marker attachment device 20, 30 is denoted by reference numeral 30 and is described in more detail below in connection with FIGS. 5, 6A, 6B, 7A and 7B.

The borescope 10 has an elongated body 100 having a proximal end 102, a distal end 104, an eyepiece or display 120 at the proximal end 102 and a tip 140 disposed at the distal end 104. The marker attachment device 20, 30 is configured to be coupled with the tip 140. The tip 140 includes lens 142 and a circumferential groove 144. The lens 142 is oriented such that a field of view of the lens 142 extends along a longitudinal axis 170 of the tip 140. In some implementations, the lens 142 is oriented such that the field of view of the lens 142 extends along a radial axis 160 of the tip 140. The lens 142 passes light within its field of view to optics for capturing images. The optics may include, for example, fiber-optic cables for transmitting captured light from the lens 142 to an eyepiece and/or display 120. Additionally, or alternatively, the optics may include a camera disposed at the tip 140. The camera may capture an image within the field of view of the lens 142 and electrically transmit the image to the display 120.

In some implementations, the elongated body 100 may further include optical cables for transmitting light from a light source through the tip 140 into the field of view of the lens 142. In some implementations, a light source, for example, a light emitting diode, may be disposed in the tip 140 for transmitting light into the field of view of the lens 142.

Still referring to FIG. 1, the elongated body 100 is flexible and includes an articulating section 150 adjacent to the distal end 104. A user may control the articulating section 150 to manipulate an orientation of the tip 140 via a user input device 180 at proximal end 102. For example, the articulating section 150 may be controlled via the user input device 180 to articulate, or bend, with respect to a longitudinal axis 170 of the elongated body 100. In some implementations, the user input device 180 may be a joystick, a touchscreen, or other device for receiving control inputs from the user. The elongated body 100 and/or articulating section 150 may further rotate about the longitudinal axis 170. Accordingly, a user may insert the elongated body 100 into a device and position the tip 140 adjacent to a target component of the device. The user may further orient the tip 140 via the articulating section 150 such that the target component is within the field of view of the lens 142. With the target component in the field of view of the lens 142, a user may inspect the component. In some implementations, the elongated body 100 may be substantially rigid with articulating section 150. In some implementations, the elongated body 100 may be rigid without an articulating section. As will become apparent from the following description, the marker attachment device 20,30 may be used to mark a target component while inspecting a device or equipment.

Figure 2:
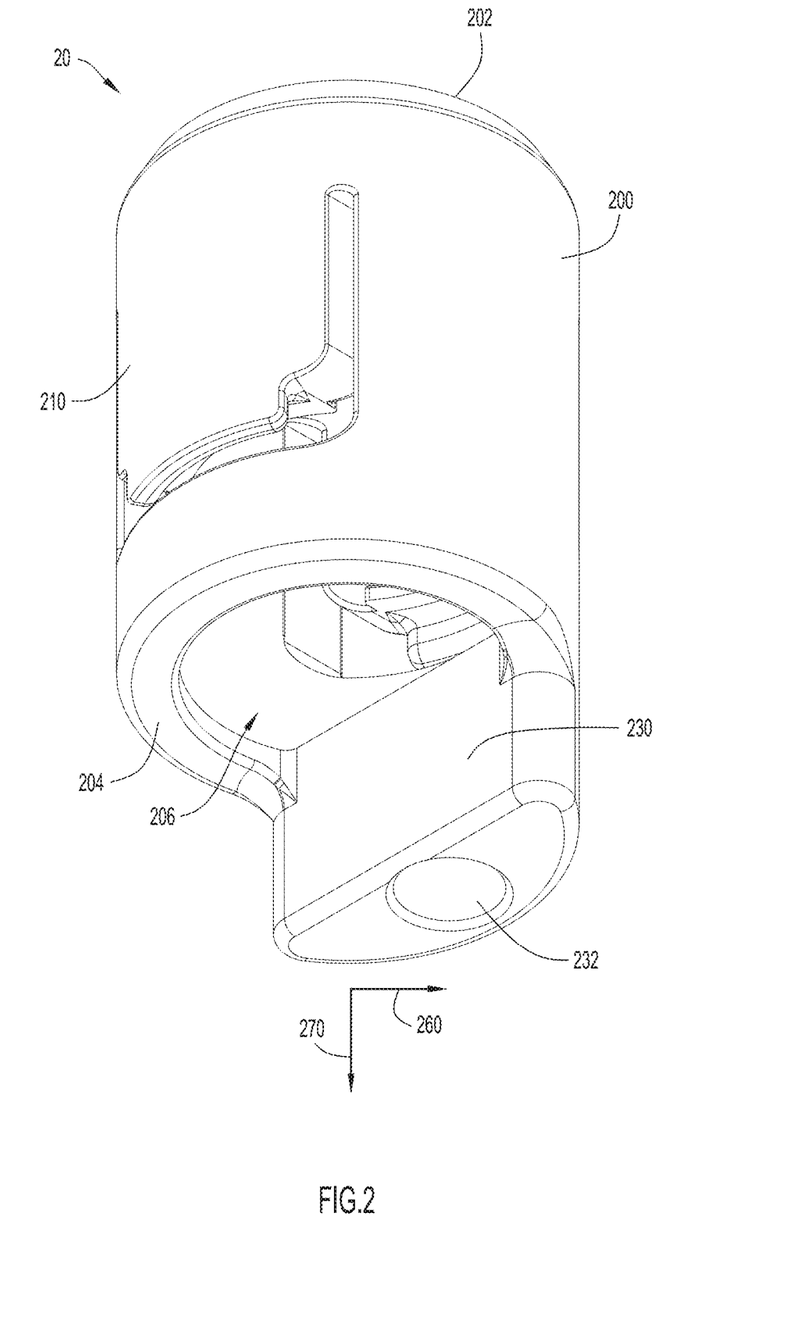
FIG. 2 is a perspective view of a marker attachment device, according to an example embodiment.

FIGS. 2, 3A, 3B, 4A, and 4B illustrate respective views of an example marker attachment device 20 according to one example embodiment. Referring to FIG. 2, a perspective view of the marker attachment device 20 is shown. The marker attachment device 20 includes an attachment body 200 having a generally cylindrical shape with a radial axis 260 and a longitudinal axis 270. The attachment body 200 includes a proximal end 202, a distal end 204, a first tab 210 and a second tab 220 disposed between the proximal end 202 and distal end 204, and an aperture 206 disposed at the distal end 204. The attachment body 200 further includes a protrusion 230 extending from the distal end 204 of the attachment body 200. The protrusion 230 extends parallel to the longitudinal axis 270 of the attachment body 200. The protrusion 230 includes a cavity 232 extending along a longitudinal axis of the protrusion 230. The protrusion 230 may receive via the cavity 232 an applicator (such as applicator 234 illustrated in FIG. 4A) for applying ink or paint to an object. For example, the applicator may comprise a felt material, similar to a felt-tipped pen, though any material capable of absorbing an applying ink or paint may be used. In some implementations, the applicator may include chalk or graphite, and the chalk or graphite is used to mark the target. Though the attachment body 200 is shown as having a cylindrical shape, the attachment body 200 may have any shape that conforms to a desired borescope. For example, the shape of the attachment body 200 may include, but is not limited to, a cube, cuboid, cone, triangular prism, tetrahedron, and pyramid.

Figure 3A:
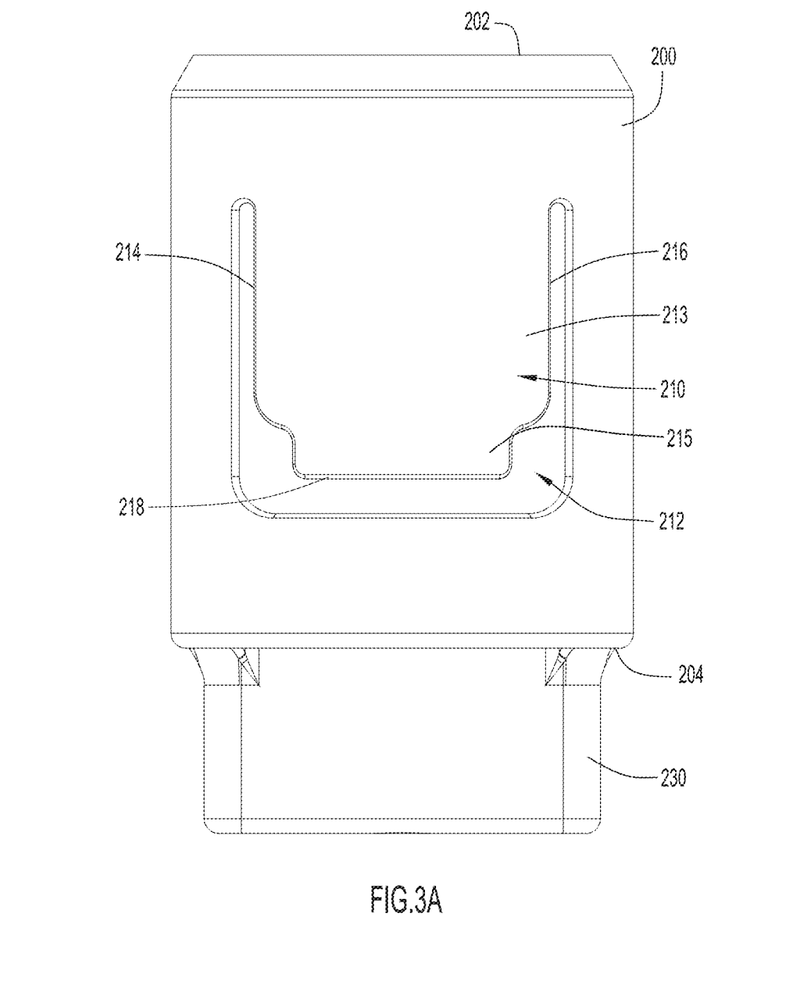
FIGS. 3A and 3B are front and side views of the marker attachment device of FIG. 2, according to an example embodiment.
Figure 3B:
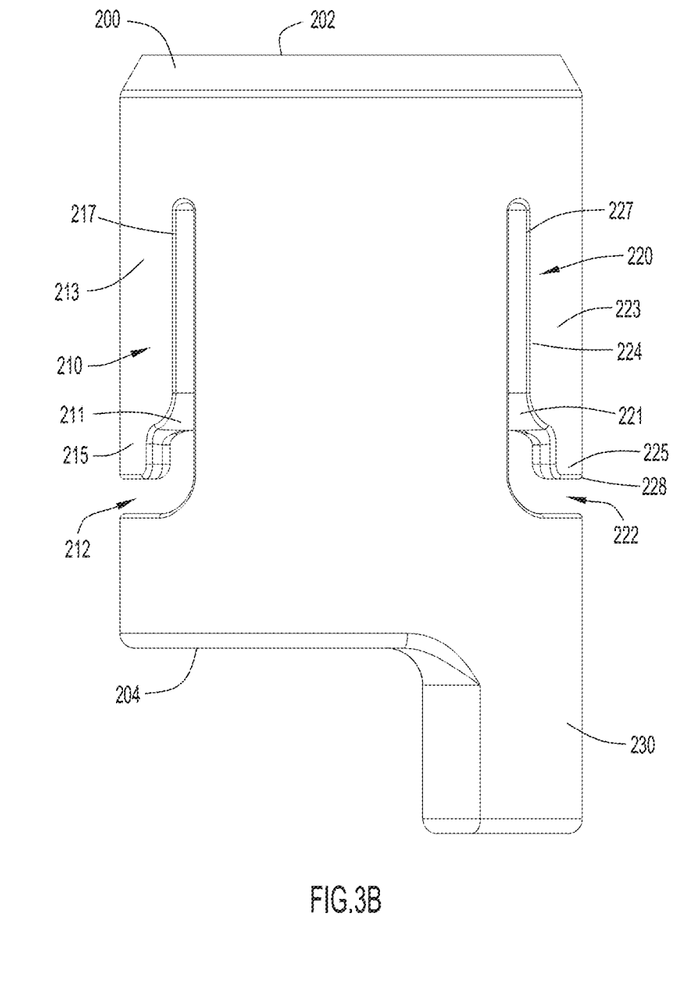

Now referring to FIGS. 3A and 3B, front and side plan views of the marker attachment device 20 are shown. A U-shaped first gap 212 in the attachment body 200 defines the first tab 210. The U-shaped first gap 212 extends radially through a sidewall of the attachment body 200 and defines a first lateral side 214, a second lateral side 216 and a distal end 218 of the first tab 210. The first gap 212 may increase the flexibility of the first tab 210. The attachment body 200 may further include a second U-shaped gap 222 extending radially through the sidewall of the attachment body 200 to define a second tab 220. The second gap 222 may define a first lateral side 224, second lateral side (not shown), and a distal end 228 of the second tab 220. The second gap 222 may increase the flexibility of the second tab 220. Though the gaps 212, 222 are shown and described as being U-shaped, the gaps 212, 222 may have any shape. For example, the gaps 212, 222 may be L-shaped, V-shaped, C-shaped, J-shaped, W-shaped, or any other shape.

The first tab 210 further includes a first tab tooth, or tongue, 211 and a first parapet 215. The second tab 220 further includes a second tab tooth 221 and second parapet 225. The first tab tooth 211 extends radially inward from an interior surface 217 of a sidewall 213 of the first tab 210. The second tab tooth 221 similarly extends radially inward from an interior surface 227 of sidewall of the second tab 220. The first tab tooth 211 and second tab tooth 221 are configured to engage a circumferential groove 144 of a borescope tip 140, as depicted in FIG. 1.

The first parapet 215 is disposed at the distal end 218 of the first tab 210 and extends towards the distal end 204 of the attachment body 200. The width of the first parapet 215 is less than a width of the first tab sidewall 213. For example, a circumferential length of the first parapet 215 is less than a circumferential length of the sidewall 213 of the first tab 210. Similarly, the second parapet 225 extends from the distal end 228 of the second tab towards the distal end 204 of the attachment body 200. Likewise, the width of the second parapet 225 is less than a width of the second tab sidewall 223. For example, a circumferential length of the second parapet 225 is less than a circumferential length of the second tab sidewall 223 of the second tab 220.

Figure 4A:
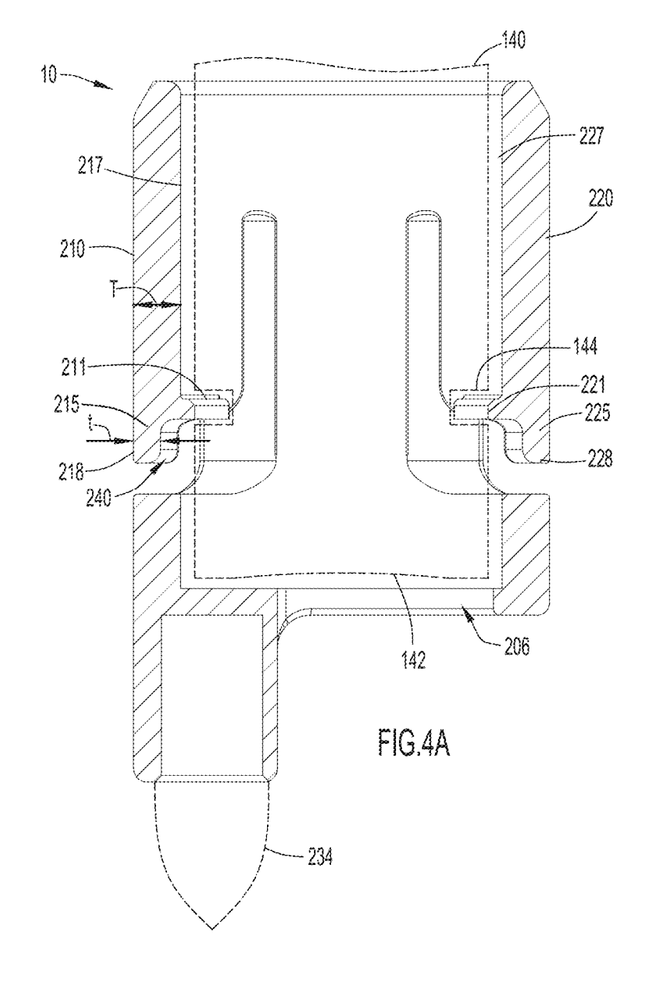
FIG. 4A is a cross-section of the marker attachment device taken along line A-A of FIG. 3A, according to an example embodiment.

Referring to FIG. 4A, a cross-sectional view of the marker attachment device 20 affixed to a borescope tip 140 is shown. The borescope tip 140 is received within the attachment body 200, and the lens 142 of the borescope is aligned with the aperture 206 of the attachment body 200. An applicator 234 is received in the receiving cavity 232 and is disposed within the field of view of the lens 142. The first tab tooth 211 and second tab tooth 221 at the distal ends 218, 228 of the tabs 210, 220 engage the circumferential groove 144 of the borescope tip 140. Inner surfaces of the attachment body 200, first tab 210, and second tab 220 are in close proximity to outer surface of the tip 140. In some implementations, the inner surfaces of the attachment body 200, first tab 210, and second tab 220 contact the outer surface of the borescope tip 140.

Figure 4B:
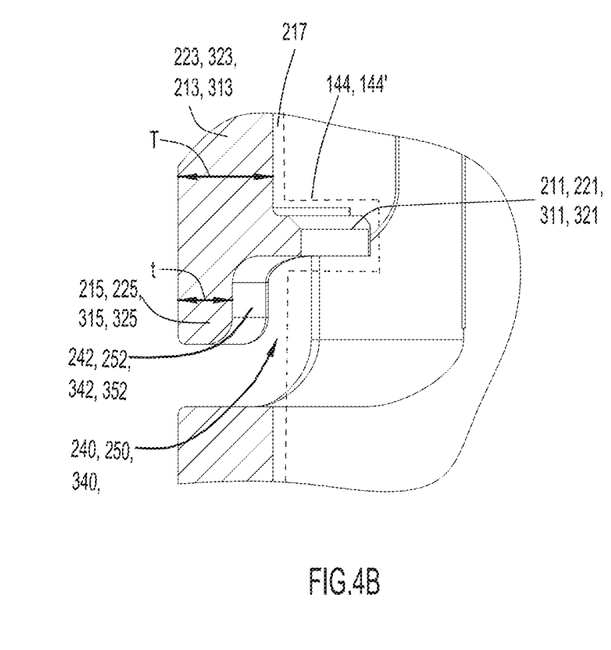
FIG. 4B is a detail view of section C in FIG. 4A, according to an example embodiment.

Referring to FIG. 4B, an outer surface of the first parapet 215 may be coplanar with an outer surface of sidewall 213 of the first tab 210. The first parapet 215 also has a thickness t which is less than a thickness T of the first tab sidewall 213.

Accordingly, a gap 240 between an inner surface of the first parapet 215 and outer surface of the borescope tip 140 is formed when a borescope tip 140 is received in the marker attachment device 20.

The engagement between the circumferential groove 144 and the teeth 211, 221 prevent the marker attachment device 20 from sliding off of the borescope tip 140. That is, the marker attachment device 20 may not be removed until the tabs 210, 220 disengage the circumferential groove 144 of the borescope tip 140. For example, the marker attachment device 20 may be coupled to the borescope tip 140 until the tabs 210, 220 are radially displaced by a sufficient amount to disengage the teeth 211, 221 from the circumferential groove 144. In some implementations, the displacement may cause the tabs 210, 220 to be plastically deformed. That is, the tabs 210, 220 may not return to their original shape after sufficient displacement. In some implementations, the tabs 210, 220 may be torn from the attachment body 200. Accordingly, the tabs 210, 220 may not engage the circumferential groove 144 of the borescope tip 140 and the marker attachment device 20 can be removed by sliding off the tip 140.

To radially displace the tabs 210, 220, a user may insert a tool, finger, or finger nail into the gaps 240, 250 to engage and exert a radial force to inner surfaces 242, 252 of the first and second parapets 215 and 225, respectively. The radial force applied by the tool, finger, or finger nail to the inner surfaces 242, 252 may cause the tabs 210, 220 to plastically deform and/or be torn away from the attachment body 200. With tabs 210, 220 plastically deformed and/or torn away from the attachment body 200, the marker attachment device 20 may be decoupled from the tip 140 and may be removed.

Although two tabs 210, 220 are shown in FIGS. 3A, 3B and 4A, the attachment body 200 may include more tabs. Alternatively, the attachment body 200 may include only one tab. Based on the number of tabs, the size of an individual tab may be adjusted in alternative example embodiments. In some implementations, the tabs may have no teeth 211, 221, and the attachment body 200 may be coupled to the borescope tip 140 via an interference fit. For example, friction between an inner surface of the attachment body 200 and an outer surface of the tip 140 couples the marker attachment device 20 to the borescope tip 140.

Figure 5:
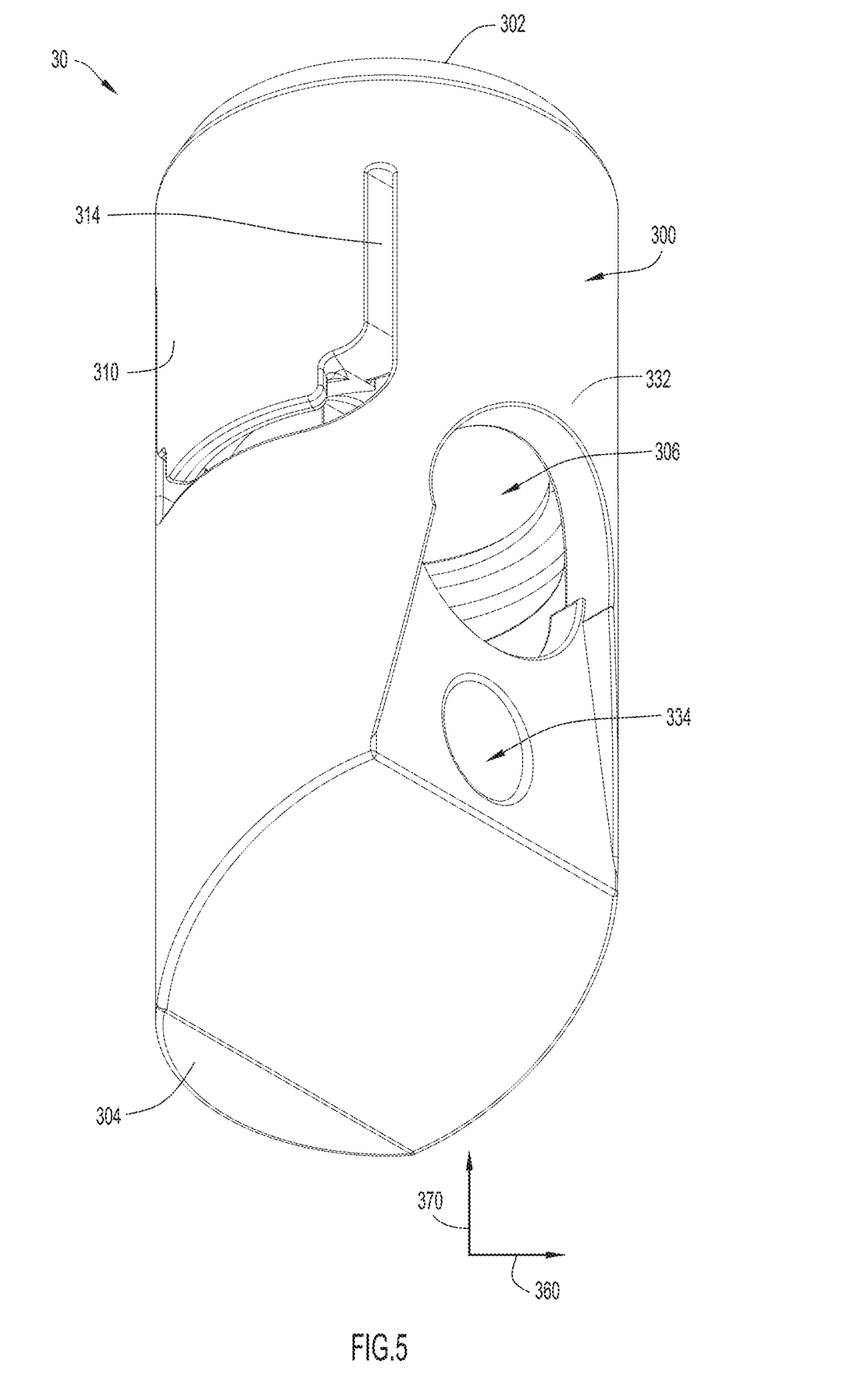
FIG. 5 is a perspective view of a marker attachment device, according to another example embodiment.

FIGS. 5, 6A, 6B, 7A and 7B depict a marker attachment device 30 according to another example embodiment, for use with an angled borescope. Referring to FIG. 5, a perspective view of the marker attachment device 30 is shown. The marker attachment device 30 includes an attachment body 300 having a generally cylindrical shape. The attachment body 300 includes a proximal end 302, a distal end 304, a first tab 310 and a second tab 320 (see FIG. 6B) disposed between the proximal end 302 and distal end 304, and an aperture 306 disposed distal to the tabs 310, 320. A central axis of the aperture 306 is aligned substantially along a radial axis 360 of the attachment body 300. That is, the aperture 306 extends radially through a sidewall 332 of the attachment body 300. The attachment body 300 further includes a cavity 334 extending substantially in a radial direction of the attachment body 300 (e.g., radial axis 360). That is, the cavity 334 extends into the attachment body 300 transverse to a longitudinal axis 370 of the attachment body 300. The cavity 334 may receive an applicator for applying ink, paint, chalk or graphite to an object. For example, the applicator may comprise a felt material, similar to a felt-tipped pen, though any material capable of absorbing an applying ink or paint may be used. In some implementations, the applicator may be chalk or graphite, and the chalk or graphite is used to mark the target. Though the attachment body 300 is shown as having a cylindrical shape, the attachment body 300 may have any shape that conforms to a desired borescope. For example, the shape of the attachment body 300 may include, but is not limited to, a cube, cuboid, cone, triangular prism, tetrahedron, and pyramid.

Figure 6A:
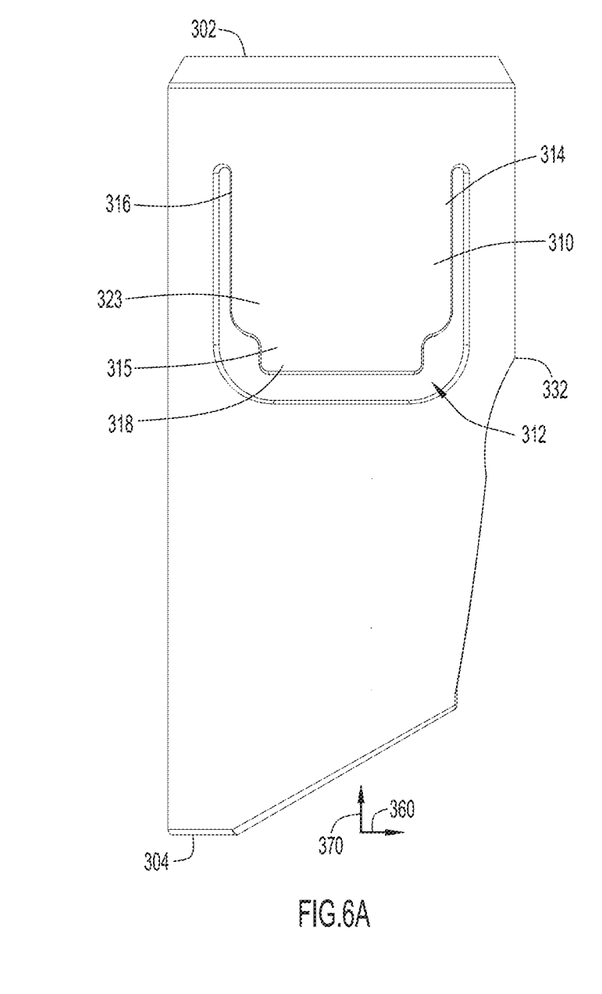
FIGS. 6A and 6B are front and side views of the marker attachment device of FIG. 5, according to an example embodiment.
Figure 6B:
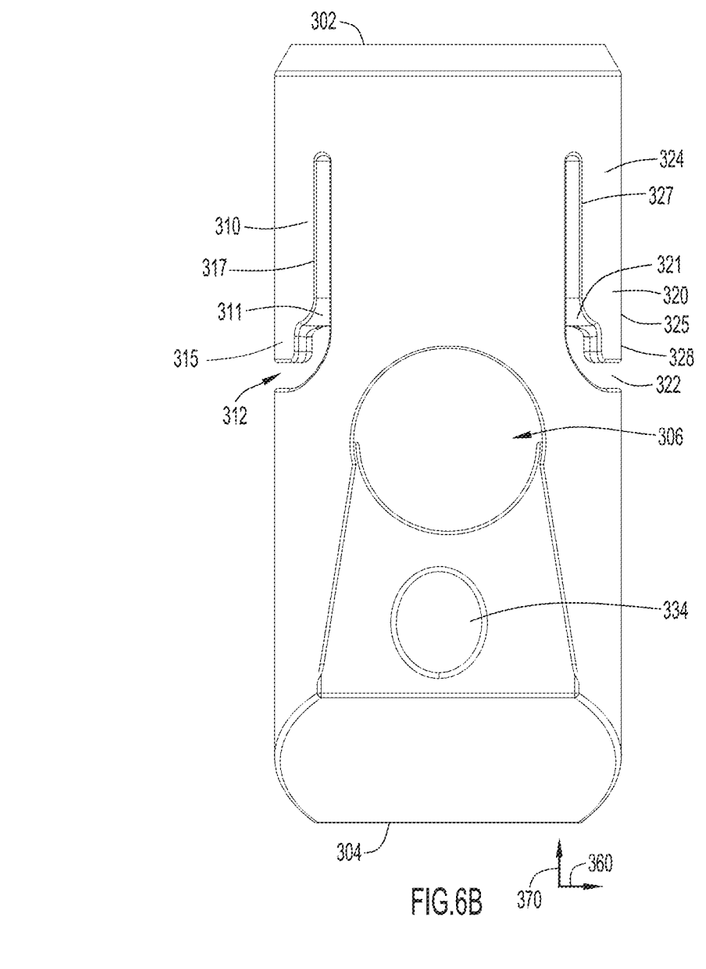

Now referring to FIGS. 6A and 6B, front and side plan views of the marker attachment device 30 is shown. A U-shaped first gap 312 in the attachment body 300 defines the first tab 310. The U-shaped first gap 312 extends radially through a sidewall of the attachment body 300 and defines a first lateral side 314, a second lateral side 316 and a distal end 318 of the first tab 310. The first gap 312 may increase the flexibility of the first tab 310. The attachment body 300 may further include a second U-shaped gap 322 extending radially through the sidewall of the attachment body 300 to define a second tab 320. The second gap 322 may define a first lateral side 324, second lateral side (not shown), and a distal end 328 of the second tab 320. The second gap 322 may increase the flexibility of the second tab 320.

The first tab 310 further includes a first tab tooth 311 and a first parapet 315. The second tab 320 further includes a second tab tooth 321 and second parapet 325. The first tab tooth 311 extends radially inward from an interior surface 317 of a sidewall 313 of the first tab 310. The second tab tooth 321 similarly extends radially inward from an interior surface 327 of sidewall of the second tab 320. The first tab tooth 311 and second tab tooth 321 are configured to engage a circumferential groove 144 of a borescope tip 140, as depicted in FIG. 1.

The first parapet 315 is disposed at the distal end 318 of the first tab and extends towards the distal end 304 of the attachment body 300. The width of the first parapet 315 is less than a width of the first tab sidewall 313. For example, a circumferential length of the first parapet 315 is less than a circumferential length of the sidewall 313 of the first tab 310. Similarly, the second parapet 325 extends from the distal end 328 of the second tab towards the distal end 304 of the attachment body 300. And the width of the second parapet 325 is less than a width of the second tab sidewall 323. For example, a circumferential length of the second parapet 325 is less than a circumferential length of the second tab sidewall 323 of the second tab 320.

Figure 7A:
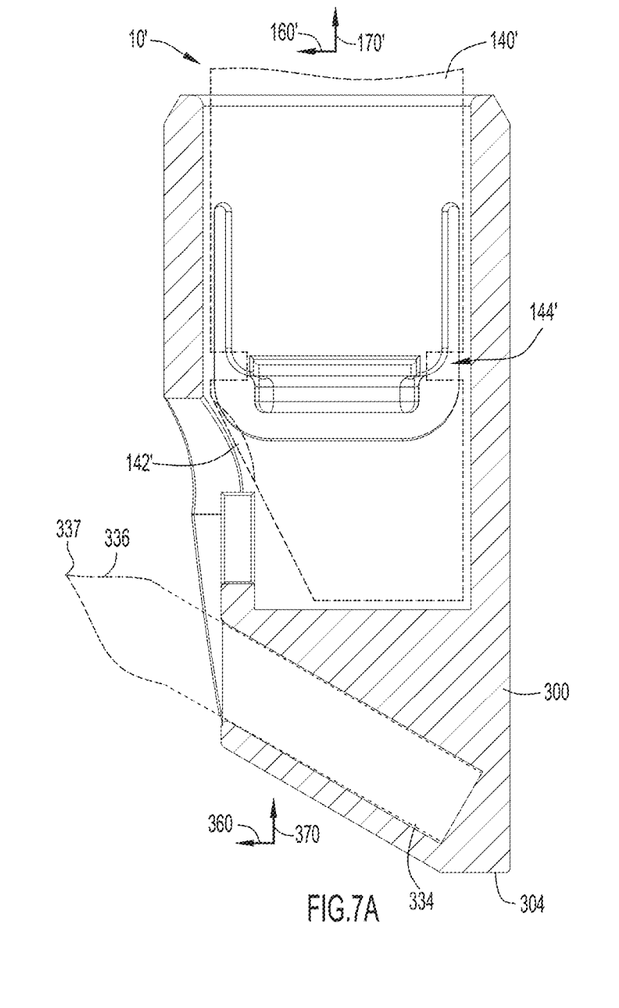
FIG. 7A is a cross-section of the marker attachment device taken along line A-A of FIG. 6A, according to an example embodiment.
Figure 7B:
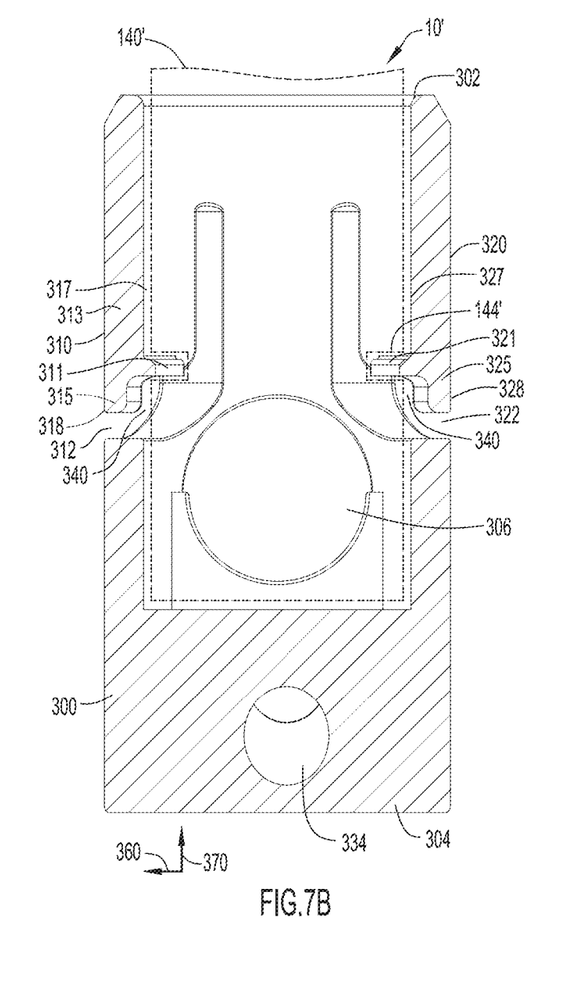
FIG. 7B is a cross-section of the marker attachment device taken along line B-B of FIG. 7A, according to an example embodiment.

Referring to FIGS. 7A and 7B, a cross-sectional view of the marker attachment device 30 affixed to a tip 140' of an angled borescope 10' is shown. The angled borescope 10' is similar to the borescope 10 discussed above; however, the angled borescope 10' has a lens 142' having an optical axis that is angled relative to the longitudinal axis 170' of the tip 140'. Thus, the field of view of the lens 142' is angled with respect to the longitudinal axis 170' of the tip 140'. Accordingly, the field of view of the lens 142' is also angled with respect to the tip 140'. For example, the optical axis of the lens 142' may be angled about 90 degrees with respect the longitudinal axis 170' of the tip 140'. Thus, the field of view of the lens projects from a lateral side of the tip 140'. In some implementations, the lens 142' optical axis may be angled at about 15 degrees, 30 degrees, 45 degrees or 75 degrees with respect to the longitudinal axis 170'.

When the tip 140' of the angled borescope 10' is received within the attachment body 300, the lens 142' is aligned with the aperture 306 of the attachment body 300. An applicator 336 is received in the receiving cavity 334 and a distal end 337 of the applicator 336 is disposed within the field of view of the lens 142'. As best shown in FIG. 7A, the applicator 336 and cavity 334 are disposed at an angle with respect to the radial axis 360. For example, the angle at which the cavity 334 and applicator 336 extend may be about 30 degrees. In some implementations, the angle may be between about 10 to 50 degrees, 20 to 40, or 25 to 35 degrees from the radial axis 360.

The first tab tooth 311 and second tab tooth 321 at the distal ends 318, 328 of the tabs 310, 320 engage the circumferential groove 144' of the borescope tip 140' of the borescope 10'. Inner surfaces of the attachment body 300, first tab 310, and second tab 320 are in close proximity to outer surface of the tip 140'. In some implementations, the inner surfaces of the attachment body 300, first tab 310, and second tab 320 contact the outer surface of the borescope tip 140'.

Similar to the tab configurations described with respect to FIG. 4B above, an outer surface of the first parapet 315 may be coplanar with an outer surface of sidewall 313 of the first tab 310. The first parapet 315 also has a thickness t which is less than a thickness T of the first tab sidewall 313. Accordingly, a gap 340 between an inner surface of the first parapet 315 and outer surface of the angled borescope tip 140' is formed when an angled borescope tip 140' is received in the marker attachment 30. The configuration of the second parapet 325 of the second tab 320 may be similar to the configuration of the first parapet 315 described above. Accordingly, tabs 310, 320 engage the circumferential groove 144' of the angled borescope tip 140' to affix the marker attachment device 30 to the tip 140' of the borescope. Further, the gap 340 between the first and second parapets 315 and 325 and tip 140' may be used to insert a tool or finger nail to engage and exert a radial force to inner surfaces 342 and 352 of the first and second parapets 315 and 325, respectively. The radial force applied by the tool or finger nail to the inner surfaces 342, 352 may cause the tabs 310, 320 to plastically deform and/or be torn away from the attachment body 300. With tabs 310, 320 plastically deformed and/or torn away from the attachment body 300, the marker attachment device 30 may be decoupled from the angled borescope tip 140' and may be removed.

Although two tabs 310, 320 are shown in FIGS. 5, 6A, 6B, 7A and 7B, the attachment body 300 may include more tabs. Alternatively, the attachment body 300 may include only one tab. Based on the number of tabs, the size of an individual tab may be adjusted in alternative example embodiments. In some implementations, the tabs may have no teeth 311, 321, and the attachment body 200 may be coupled to the borescope tip 140 via an interference fit. For example, friction between an inner surface of the attachment body 300 and an outer surface of the tip 140' couples the marker attachment device 30 to the borescope tip 140'.

Figure 8:
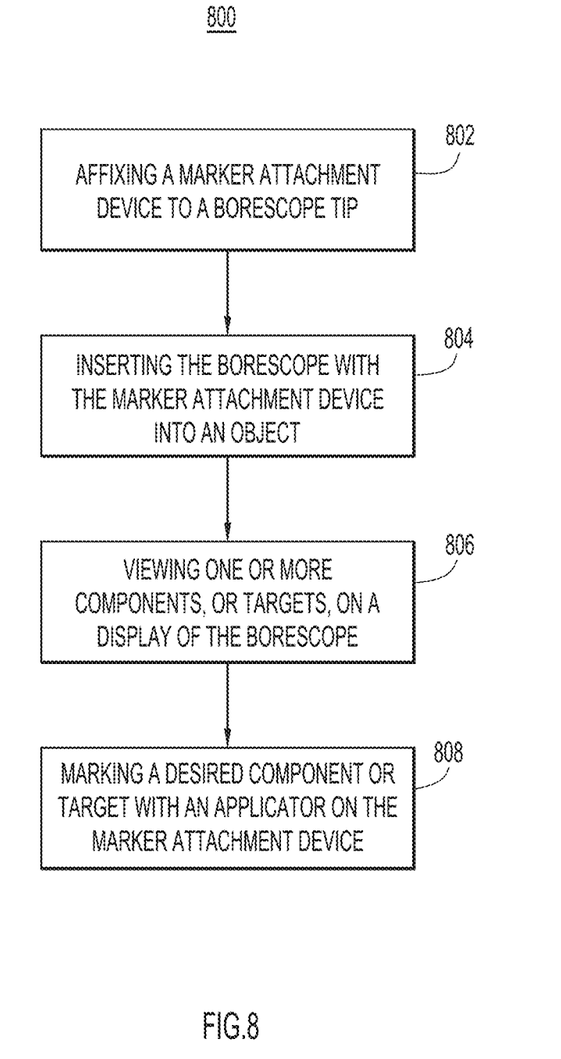
FIG. 8 is a method of marking a component within a device using the marker attachment device, according to an example embodiment.

Referring to FIG. 8, a block diagram of a method 800 of marking a target component disposed in a concealed space is shown. The method 800 may be applied with the borescope 10, 10' and marker attachment device 20, 30 described above. The method 800 includes affixing a marker attachment device to a borescope tip in operation 802, inserting the borescope with the marker attachment device into an object in operation 804, viewing one or more components, or targets, on a display of, or associated with, the borescope in operation 806, and marking a desired component or target with an applicator on the marker attachment device in operation 808.

In operation 802, the marker attachment may be slid on to a tip of the borescope until a tab on the marker attachment device engages a tip of the borescope. The tab may include a tooth which engages a circumferential groove of the tip. The tooth and groove cooperate to couple the marker attachment device to the borescope tip. In some implementations, there may be more than one tab. In some implementations, an applicator may be affixed to a distal end of the marker attachment device and paint or ink may be applied to the applicator. In some implementations, the applicator may be affixed to the marker attachment device prior to the marker attachment being coupled to the borescope tip.

In operation 804, a user may maneuver the borescope tip affixed with the marker attachment device into a concealed space for inspection of a component disposed in the concealed space. For example, the borescope tip with the marker attachment may be inserted into a port leading to the concealed space. In some implementations, the concealed space is an interior space of a device. For example, the device may be a turbine engine and the concealed space may be a fan, compressor, turbine, combustion can or other space bound by a shroud and/or casing of the turbine.

In operation 806, a user may view on a display of, or associated with, the borescope one or more components or targets disposed within the concealed space within a field of view of a lens of the borescope. For example, the one or more targets may be a plurality of similar compressor blades. A user may inspect each of the one or more targets for damage and/or wear.

In operation 808, the user may mark a desired target of the one or more targets with an applicator disposed on a distal end of the marker attachment device. For example, a user may manipulate the borescope until the applicator contacts a surface of the desired target. A user may further move the applicator along the surface of the target thereby applying an ink or paint to the desired target. For example, the desired target may be a damaged and/or worn blade of a turbine compressor.

Figure 9:
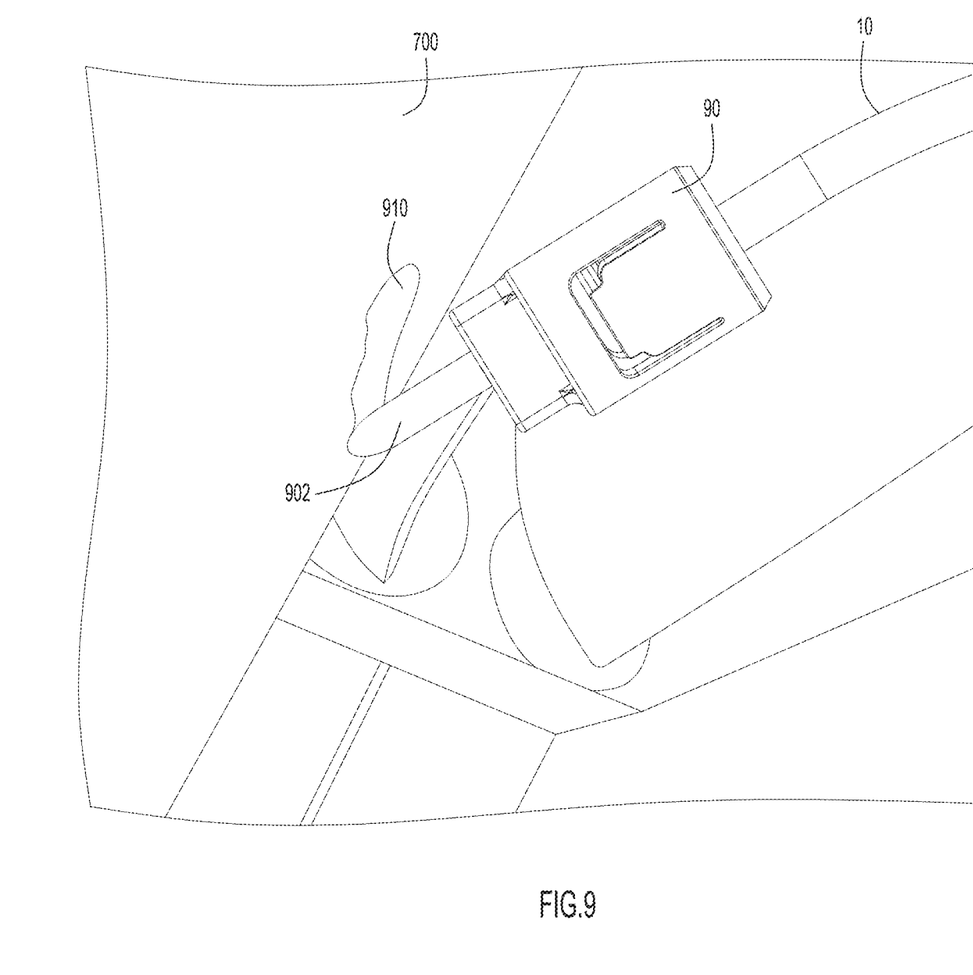
FIG. 9 is an illustration of the marker attachment device marking a component of a device, according to an example embodiment.

FIG. 9 is a diagram illustrating a borescope 10 with a marker attachment device 90 marking a targeted blade 700 while disposed within a turbine engine. The marker attachment device 90 may take the form of marker attachment device 20 or marker attachment device 30 presented herein. As shown in FIG. 9, the desired target or blade 700 may be marked for replacement or for further monitoring by contacting the surface of the blade 700 with the applicator 902 and moving the applicator 902 along the surface. A user may distinguish a mark 910 for replacement from a mark for monitoring using any desired symbol or design. For example, a user may mark the target with a check mark ("✓") denoting further monitoring of the component desired, or a "X" denoting replacement of the target is desired. However, any symbol may be used to mark a component for any purpose.

Once a user has completed the inspection and marked the desired targets, the borescope may be removed from the device. To remove the marker attachment from the borescope tip, a user simply peels back the tab until it is plastically deformed or torn away from a body of the marker attachment. The marker attachment is no longer engaged with the borescope tip and may slide off.

Marking may involve application of paint, ink, chalk, graphite or another material by the applicator 902 onto the targeted device/equipment. For example, in implementations where the desired targets are turbine engine components that are marked for further monitoring, ink or paint approved for use in turbine engines may be used. For example, an inert die or high purity, high temperature enamel paint. The ink or die may reside on the components during normal operation of the turbine after marking. During a second, later inspection, the markings on the desired targets may be visible by the naked eye, notifying a user that the target has been marked for further monitoring and/or replacement.

In implementations where the desired targets are turbine engine components that are marked for replacement, a user may disassemble the device and may visually distinguish components marked for replacement from blades which are to be monitored or for which replacement is not desired. This may improve maintenance efficiency by providing a visual indication of components that have been inspected and are to be replaced.

In one form, an attachment device is provided. The attachment device includes an attachment body having a proximal end, a distal end configured to receive an applicator, and an engagement tab disposed between the proximal end and distal end. The engagement tab is configured to engage a borescope.

In one example of the attachment device, the attachment body is annular and configured to receive a distal end of borescope.

In one example of the attachment device, the engagement tab further comprises an inner surface and a tooth extending radially inward from the inner surface.

In one example of the attachment device, the engagement tab further comprises a distal end and a parapet extending from the distal end of the engagement tab, wherein a radial thickness of the parapet is less than a radial thickness of the engagement tab.

In one example of the attachment device, a circumferential length of the parapet is less than a circumferential length of the engagement tab.

In one example of the attachment device, the engagement tab is configured to be hand-torn from the attachment body.

In one example of the attachment device, the distal end of the attachment body further comprises an axially extending protrusion and a cavity that extends into the protrusion.

In one example of the attachment device, the attachment device further includes an applicator and the cavity is configured to receive the applicator.

In one example of the attachment device, the distal end of the attachment body further comprises a cavity extending substantially in a radial direction.

In another form, a method of marking a target viewed by a borescope is provided. The method includes affixing an attachment device onto a borescope, engaging a circumferential groove extending along the borescope with an engagement tab of the attachment device, inserting the borescope with the attachment device into an object to view one or more targets disposed in the object, viewing the one or more targets on a display of the borescope; and marking a desired target of the one or more targets with an applicator disposed on a distal end of the attachment device.

In one example of the method, the method further includes removing the borescope from the object and tearing the engagement tab from the attachment device to disengage the attachment device from the borescope.

In one example of the method, marking the desired target with the applicator comprises manipulating the borescope until the applicator contacts a surface of the target.

In one example of the method, manipulating the borescope comprises moving the applicator along the surface of the target.

In one example of the method, the object is a turbine and the one or more targets include a component of the turbine.

In one example of the method, the method includes affixing the applicator to the attachment device.

In another form, a system for marking a target component is provided. The system includes a borescope having a flexible body, a tip disposed at a distal end of the flexible body, and a lens disposed at the tip. The system further includes an attachment device having an applicator, an attachment body having a proximal end and a distal end. The distal end is configured to receive the applicator. The attachment device further includes an engagement tab disposed between the proximal end and the distal end. The engagement tab is configured to engage the borescope.

In one example of the system for marking a target component, the engagement tab further comprises an inner surface and a tooth extending radially inward from the inner surface; and the borescope further comprises a tip having a circumferential groove, wherein the tooth engages the circumferential groove.

In one example of the system for marking a target component, the engagement tab further comprises a distal end and a parapet extending from the distal end of the engagement tab, wherein a radial thickness of the parapet is less than a radial thickness of the engagement tab.

In one example of the system for marking a target component, a circumferential length of the parapet is less than a circumferential length of the engagement tab.

In one example of the system for marking a target component, the distal end of the attachment body further comprises a cavity configured to receive the applicator.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the attachment marker described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An attachment device comprising:
    an attachment body comprising:
        a proximal end;
        a distal end configured to receive an applicator;
        an engagement tab disposed between the proximal end and the distal end, the engagement tab configured to engage a borescope; and
        a parapet extending from a distal end of the engagement tab, wherein a radial thickness of the parapet is less than a radial thickness of the engagement tab.

2. The attachment device of claim 1, wherein the attachment body is annular and configured to receive a distal end of borescope.

3. The attachment device of claim 1, wherein the engagement tab further comprises an inner surface and a tooth extending radially inward from the inner surface.

4. The attachment device of claim 1, wherein a circumferential length of the parapet is less than a circumferential length of the engagement tab.

5. The attachment device of claim 1, wherein the engagement tab is configured to be hand-torn from the attachment body.

6. The attachment device of claim 1, wherein the distal end of the attachment body further comprises an axially extending protrusion and a cavity that extends into the axially extending protrusion.

7. The attachment device of claim 6, wherein the cavity is configured to receive the applicator.

8. The attachment device of claim 1, wherein the distal end of the attachment body further comprises a cavity extending substantially in a radial direction.

9. A system comprising:
    a borescope comprising:
        a flexible body;
        a tip disposed at a distal end of the flexible body, the tip having a circumferential groove; and
        a lens disposed at the tip; and
    an attachment device comprising:
        an applicator;
        an attachment body having a proximal end and a distal end, wherein the distal end is configured to receive the applicator; and
        an engagement tab disposed between the proximal end and the distal end, the engagement tab configured to engage the borescope, wherein the engagement tab comprises an inner surface and a tooth extending radially inward from the inner surface;
    wherein the tooth is configured to engage the circumferential groove.

10. The system of claim 9, wherein the engagement tab further comprises a distal end and a parapet extending from the distal end of the engagement tab, wherein a radial thickness of the parapet is less than a radial thickness of the engagement tab.

11. The system of claim 10, wherein a circumferential length of the parapet is less than a circumferential length of the engagement tab.

12. The system of claim 9, wherein the distal end of the attachment body further comprises a cavity configured to receive the applicator.

13. The system of claim 12, wherein the distal end of the attachment body further comprises an axially extending protrusion, and the cavity extends into the axially extending protrusion.

14. The system of claim 12, wherein the cavity extends in a substantially radial direction.

15. An apparatus comprising:
    an attachment body configured to receive an applicator; and
    an engagement tab comprising:
        an inner surface;
        a tooth extending radially inward from the inner surface; and
        a parapet extending from a distal end of the engagement tab, wherein a radial thickness of the parapet is less than a radial thickness of the engagement tab;
    wherein the tooth is configured to engage a groove extending circumferentially around a tip of a borescope.

16. The apparatus of claim 15, wherein the attachment body is annular and configured to receive a distal end of a borescope.

17. The apparatus of claim 15, wherein a circumferential length of the parapet is less than a circumferential length of the engagement tab.

18. The apparatus of claim 15, wherein the engagement tab is configured to be hand-torn from the attachment body.

19. The apparatus of claim 15, further comprising:
    a protrusion extending axially from a distal end of the attachment body; and
    a cavity that extends into the protrusion.

20. The apparatus of claim 15, wherein the attachment body defines a cavity extending in a substantially radial direction.

* * * * *